June 13, 1967 R. E. RIEBS 3,325,688
PHASE ANGLE SENSING CIRCUIT FOR DISTANCE RELAYS
Filed Jan. 21, 1965 2 Sheets-Sheet 1

INVENTOR.
Richard E. Riebs
BY Fred Wirott
Attorney

June 13, 1967  R. E. RIEBS  3,325,688
PHASE ANGLE SENSING CIRCUIT FOR DISTANCE RELAYS
Filed Jan. 21, 1965  2 Sheets-Sheet 2

INVENTOR.
Richard E. Riebs
BY Fred Wiriott
Attorney

United States Patent Office
3,325,688
Patented June 13, 1967

3,325,688
PHASE ANGLE SENSING CIRCUIT FOR
DISTANCE RELAYS
Richard E. Riebs, Hales Corners, Wis., assignor to Mc-Graw-Edison Company, Milwaukee, Wis., a corporation of Delaware
Filed Jan. 21, 1965, Ser. No. 426,718
14 Claims. (Cl. 317—36)

This invention relates to protective-devices for electric power systems and, more particularly, to a phase angle sensing circuit for distance type relays capable of discriminating between actual line faults and power swings.

A distance relay is a protective device which operates in response to the apparent impedance of the circuit being protected. Under normal operating conditions, the apparent impedance of the protected portion of the system will fall outside of the operating range of the relay. Upon the occurrence of a fault, however, the apparent impedance of the protected circuit portion will instantly change to a value which will cause the relay to operate. Conventional distance relays are not wholly satisfactory, however, because the apparent impedance in the system may also change as the result of power swings, which are surges of power in the electrical system resulting from the removal of a fault from the system but external to the protected circuit, or from the loss of synchronism between the generator and the system.

It is an object of the invention to provide a new and improved phase angle sensing circuit for distance type relays.

A further object of the invention is to provide a phase angle sensing circuit for a distance type relay wherein the relay is provided with a characteristic which closely resembles the actual zone into which the apparent impedance of the system moves upon the occurrence of a fault.

Figure 1:
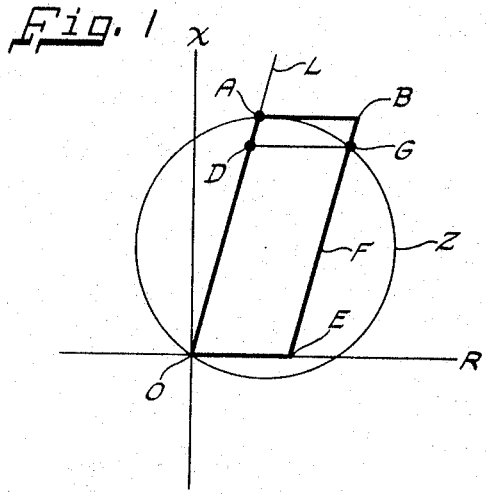
Figure 2:
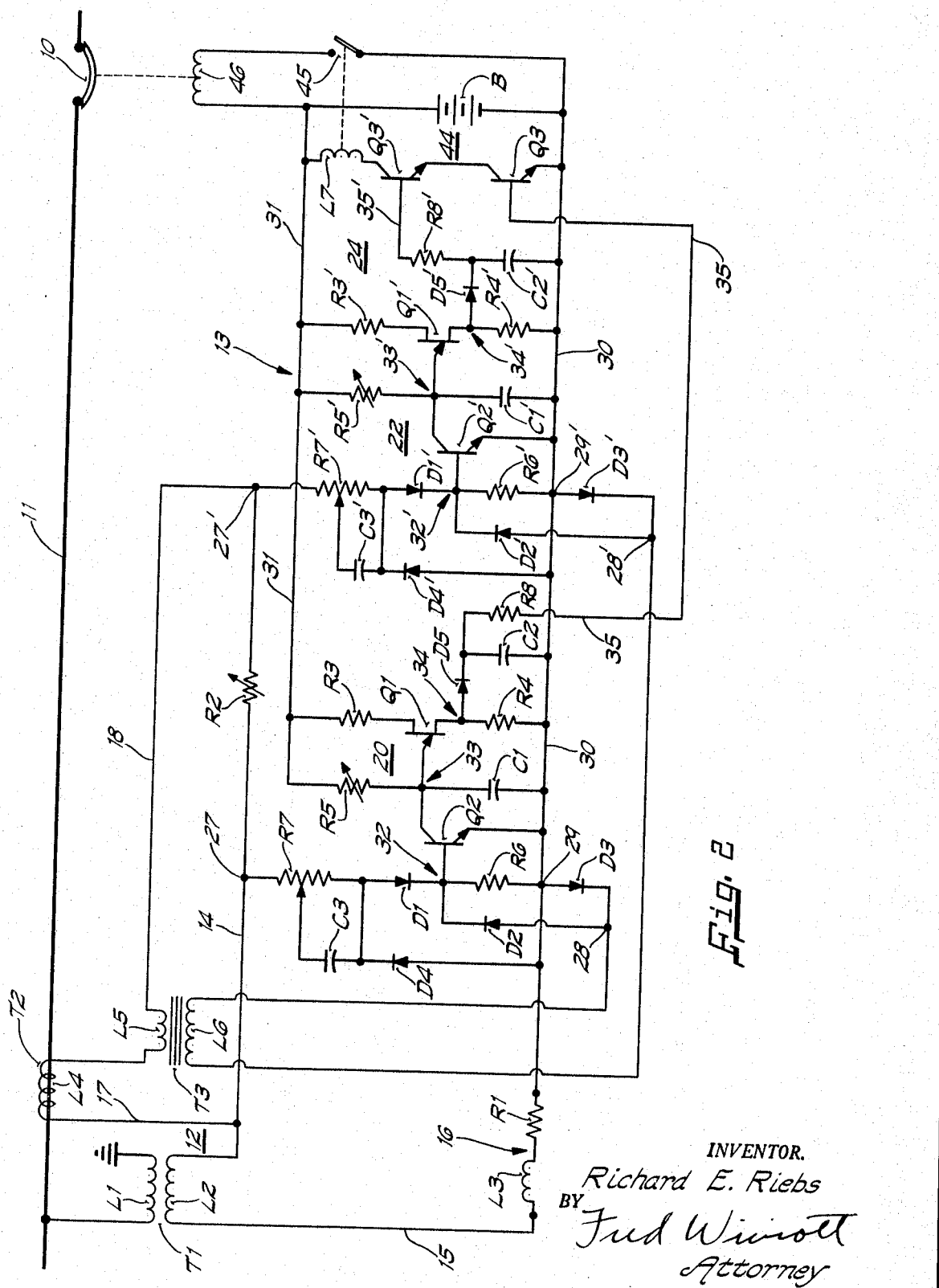

These and other objects and advantages of the instant invention will become more apparent from the detailed description thereof taken with the accompanying drawings in which:

FIG. 1 is a graphical representation on an impedance diagram of the operating characteristic of prior art distance type relays;

FIG. 2 schematically illustrates the phase angle sensing circuit according to the instant invention, as applied to a distance relay; and FIGS. 3–7 are graphical representations, in terms of impedance, of the development of the operating characteristic of the distance relay illustrated in FIG. 2.

In general terms, the invention comprises a phase angle sensing circuit adapted to be connected to first and second sources of alternating electrical signals. Logic circuit means is coupled to the inputs and time delay circuit means is disposed to be actuated by the logic circuit means whenever the electrical signals have a predetermined polarity for a given interval. In addition, output means is coupled to the time delay circuit means for producing an output signal when the time delay circuit means is actuated.

Referring now to the drawings in greater detail, FIG. 1 represents the operating characteristic of a conventional relay on an impedance diagram. The origin O of the impedance diagram represents the location of the impedance relay, while the abscissa R and the ordinate X are respectively the values of resistance and inductive reactance, as determined by the vectorial relationship between system voltage and current measured at the distance relay. The impedance of the system being protected, as viewed from the origin O, is represented by the line L. The circle Z represents the locus of impedance values which define the operating limits of a typical distance relay. Under normal operating conditions, the impedance of the system, as viewed from the distance relay, will fall on the line L outside of the circle Z, so that the distance relay will not operate. Upon the occurrence of a fault, on the other hand, the apparent impedance of the system will change to some value within the circle Z, causing the distance relay to operate. The intersection A between the apparent impedance OL of the line L and the characteristic Z of the conventional distance relay is defined as the reach of the relay. In other words, any fault occurring on the line L between the origin O and a point OA distance therefrom should cause the distance relay to operate.

During fault conditions, the apparent impedance seen by the relay at the origin O not only includes the impedance of the line L from the origin to the point of the fault, but also an additional impedance equal to the fault resistance. As a result, the apparent impedance actually seen by the distance relay is the vector sum of the line impedance from the origin to the point of the fault plus the fault resistance. It can therefore be seen that the possible locus of apparent impedance as seen by a distance relay located at the origin O with respect to the line portion OA, is defined by a parallelogram having one side lying along the line characteristic L and having a length equal to the impedance between the origin O and the end A of the line being protected. A second side of the parallelogram will be parallel to the R axis of the impedance diagram and have a length equal to the maximum possible fault resistance AB, while the other two sides of the parallelogram BE and OE will be parallel to the lines OA and OB, respectively. The area within the parallelogram OABE is the actual fault zone F of the line L. Thus, the apparent impedance of a fault on the line L between the origin O and the point A will lie within the parallelogram F and its position will depend upon the distance of the fault from the origin O and the magnitude of the fault resistance.

It can be seen from FIG. 1 that a substantial area of the characteristic Z of conventional distance relays is external of the fault zone F. It will also be apparent from FIG. 1 that the reach of conventional distance relays will vary with the magnitude of the fault resistance. Thus, with zero fault resistance, the reach of the conventional relay is to the point A on line L. On the other hand, with maximum fault resistance, the reach is reduced to the point D because the characteristic Z intersects the maximum resistance line BF of the fault zone F at point G.

Referring now to FIG. 2, the distance relay incorporating the phase angle sensing circuit according to the instant invention is shown to include interrupter switches 10 in circuit with the line 11 being protected, an input circuit 12 and a control circuit 13. Input circuit 12 is coupled to the line 11 being protected and provides the control circuit 13 with first and second pairs of electrical signals having the same phase relationship as the voltage and current flowing in the line 11. The control circuit 13 includes first and second phase angle sensing circuits 20 and 22, according to the instant invention, which are responsive to a predetermined phase relationship between these electrical signals to provide an output signal for opening the interrupting switches 10 when the apparent impedance of the line 11 falls within the fault zone F.

The input circuit 12 includes a potential transformer T1 whose primary winding L1 is connected across the line 11 for deriving the secondary voltage in winding L2 which is functionally related to the voltage in line 11. One end of secondary winding L2 is connected to a common conductor 14, while the other end thereof is connected by a conductor 15 to one end of a phase shifting network 16 consisting of an inductance L3 and a resistance R1 connected in series.

The input circuit 12 also includes a current transformer T2 whose secondary winding L4 is conductively coupled to line 11 for deriving a secondary current proportionate to and having the same phase relationship relative to the voltage in the secondary L2 of transformer T1 as the current and voltage values in the line 11. One end of winding L4 of transformer T2 is connected by conductor 17 to the common conductor 14 and at its other end is connected to one end of the primary winding L5 of a second current transformer T3. The other end of winding L5 is connected by conductor 18 to one end of a resistor R2, the other end of which is connected to the common conductor 14.

Control circuit 13 includes a first phase angle sensing circuit 20, a second phase angle circuit 22 and an output circuit 24. The phase angle sensing circuits 20 and 22 each respectively have a voltage input terminal 27 and 27′, a current input terminal 28 and 28′, and a common terminal 29 and 29′ for receiving corresponding electrical signals from the input circuit 12.

More specifically, the alternating voltage signal which is induced in the secondary winding L2 of transformer T1 is applied through the phase shifting circuit 16 to the first phase angle sensing circuit 20 through terminals 27 and 29. In addition, the voltage signal is applied to the second phase angle sensing circuit 22 through inputs 27′ and 29′, but in the latter instance it is modified by vectorially subtracting a voltage equal to the drop across R2 produced by the current in the secondary winding L4 of current transformer T2, which current is functionally related to line current.

The alternating current signals induced in the secondary winding L6 of current transformer T3 as applied to the first phase angle sensing circuit 20 through terminals 28 and 29 and to the second phase angle sensing circuit 22 through terminals 28′ and 29′. However, because terminals 28 and 28′ are connected to the opposite ends of winding L6, the alternating current signals applied to each are 180° out of phase.

The phase angle sensing circuits 20 and 22 are identical, so that corresponding parts of each will be designated by the same reference numerals, with the components of the second sensing circuit 22 being distinguished by a prime (′). Also, because the phase angle sensing circuits 20 and 22 are identical, only circuit 20 will be discussed in detail, for the sake of brevity.

Power is supplied to the circuits 20 and 22 through conductors 30 and 31 which are respectively connected to the negative and positive terminals of a unidirectional source symbolized by a battery B.

In general, the first phase sensing circuit includes an OR logic circuit 32, a time delay circuit 33 and an output circuit 34. The OR logic circuit 32 is coupled to the input terminals 27, 28 and 29 for producing a first signal whenever the electrical signal at either of the inputs 27 or 28 has a predetermined polarity. The time delay circuit 33 is coupled to the OR logic circuit 32 for being charged when signals of a predetermined polarity appear at each of the terminals 27 and 28 and the output circuit 34 is connected to the time delay circuit for producing an output signal after the time delay circuit has charged for a predetermined interval.

More specifically, the output circuit 34 includes a unijunction transistor Q1 whose base-one-electrode is connected through a first resistor R4 to the negative power supply conductor 30 and whose base-two-electrode is connected through a second resistor R3 to the positive power supply conductor 31. The time delay circuit 33 includes a capacitor C1 connected between the emitter electrode of Q1 and an adjustable resistor R5 connected between said emitter electrode and conductor 31.

The OR logic circuit 32 includes a NPN transistor Q2 and an adjustable resistor R7, a diode D1 and a resistor R6, which are connected in series with each other and between the terminals 27 and 29. The emitter-collector circuit of transistor Q2 shunts capacitor C1 and its base is connected to the junction between diode D1 and resistor R6.

A pair of diodes D2 and D3 connect the current signal input terminal 28 to resistor R6 to provide unipolarity current flow through R6. A third diode D4 shunts the resistor R6 and the diode D1 and a capacitor C3 is connected between the diode D4 and the wiper of the adjustable resistor R7.

The base-one electrode of unijunction transistor Q1 is connected by a diode D5 to one side of a resistor R8, the other side of which is connected by conductor 35 to the output circuit 24. Also, a capacitor C2 is connected between diode D5 and the negative supply conductor 30.

When the transistor Q2 is nonconductive, capacitor C1 will receive charging current from conductors 30 and 31 through resistor R5. After capacitor C1 has charged for a predetermined length of time, the emitter of unijunction transistor Q1 becomes forward biased, and emitter-base-one current will flow through resistor R3. This produces an output signal through diode D5, to charge capacitor C2. The potential across capacitor C2 applied through resistor R8 and conductor 35 comprises an output signal to the output circuit 24. The time required for capacitor C1 to charge to the potential required to forward bias the emitter of unijunction Q1 will depend upon the resistance of adjustable resistor R5.

It will be appreciated that the voltage on the input terminal 27 will alternate as the potential in the line 11 alternates. When the potential in terminal 27 is positive, current will flow through resistor R7, diode D1 and resistor R6. As a result, transistor Q2 will be forward biased to short circuit capacitor C1. In a similar manner, the current signal in input terminal 28 will alternate as the current in the line 11 alternates. When the current signal at terminal 28 is positive, current will flow through diode D2, resistor R7, to forward bias transistor Q2 and short circuit capacitor C1. It can thus be seen that capacitor C1 will be short circuited whenever either the voltage at terminal 27 or the current at terminal 28 is positive. Conversely, capacitor C1 can charge only when both the voltage at terminal 27 and the current at terminal 28 are negative. Accordingly, an output signal is produced only if the voltage at terminal 27 and the current at terminal 28 are both negative for a period equal to or longer than the time required for capacitor C1 to charge to the potential required to forward bias the emitter of unijunction Q1.

Assume, for example, that in order to reach the required potential, capacitor C1 must charge for a period of $29/72$ of a cycle. Assume, further, with reference to FIG. 3, that the current vector I leads the voltage vector V by an angle of $\pm \theta$. As a result, the voltage V and the current I will both be negative for $180° - \theta$. Since $29/72$ of a cycle is required for the capacitor C1 to become charged to the desired potential, an output signal will be produced whenever $180° - \theta$ is equal to or greater than $29/72$ of a cycle, or $\theta$ is 35° or less. Thus, if the effect of capacitor C3 and the phase shifting circuit 16 are neglected in the illustrated example, the first phase angle sensing circuit 20 will have the characteristic 40 plotted on the impedance diagram of FIG. 4, wherein an output signal will be provided whenever the phase angle between the voltage and current is equal to or less than the angle $\pm \theta$.

Figure 5:
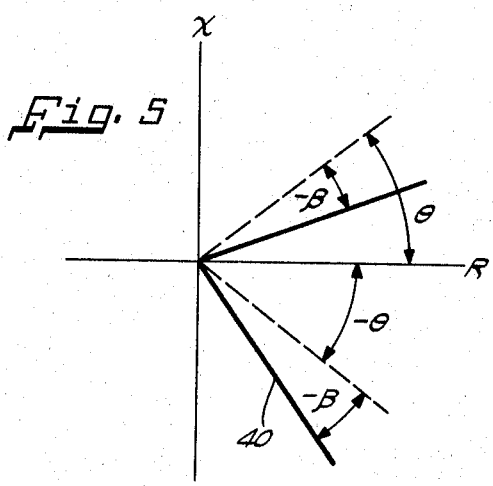
Figure 3:
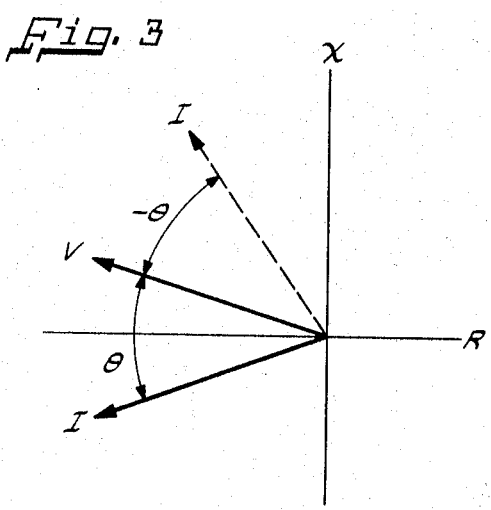
Figure 4:
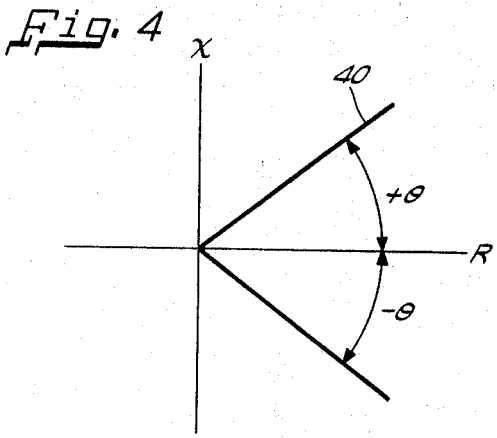

It can be seen that when capacitor C3 and phase shifting circuit 16 are neglected, the characteristic 40 of the phase angle sensing circuit 20 is symmetrical with respect to the R axis of the impedance diagram of FIG. 4. The capacitor C3 of FIG. 2 is provided for rotating this characteristic through an angle $-\beta$ as shown in FIG. 5. Capacitor C3, which is connected to the wiper of resistor R7, shifts the phase of the current flowing from conductor 14 through diode D1 and the base emitter circuit of transistor Q1. As a result, the entire characteristic angle of the first phase sensing circuit 20 has rotated about its apex through the angle $-\beta$. Thus, neglecting the phase shifting circuit 16, the phase angle sensing circuit 20 will have the characteristic 40 shown by full lines in FIG. 5 wherein an output signal will be produced whenever the angle between the voltage at terminal 27 and the current at terminal 28 is equal to $(\theta-\beta)$ or $-(\theta+\beta)$. The angle $\beta$ can be adjusted by moving the wiper of resistor R7 to vary the impedance angle of the parallel combination of R7 and C3.

As stated hereinabove, the second phase angle sensing circuit 22 is identical to the first phase angle sensing circuit 20. As a result, capacitor C1' will charge whenever the voltage at terminal 27' and the current signals at terminal 28' are both negative. However, because resistor R2 is connected between conductor 14 and terminal 27', the voltage input signal to the second phase angle sensing circuit 22 will be the vector sum of the line voltage signal at the terminals 27–29 and $(-IR2)$ where I is the current induced in the secondary L4 of current transformer T2 and which is functionally related to line current. For this reason, the characteristic 42 of the second phase angle sensing circuit 22 will be displaced a distance R7 on the R axis of the impedance diagram seen in FIG. 6. In addition, because terminals 29 and 29' are connected to the opposite sides of secondary winding L6 of transformer T3, the current input signal to the second phase angle sensing circuit 22 will be 180° out of phase with the current signal to the first phase angle sensing circuit 20. This has the effect of reversing the direction of characteristic 42 of the second phase angle sensing circuit 22 as seen in FIG. 6.

In the foregoing development of the characteristics of the phase angle sensing circuits 20 and 22, the effect of the phase shifting circuit 16 has been neglected. It will be appreciated that if the combined characteristic of FIG. 6 is rotated through the angle $\alpha$, as seen in FIG. 7, it can be made to correspond to the full zone F shown in FIG. 1. This rotation of the characteristics 40 and 42 is obtained by placing the phase shifting circuit in the voltage supply circuit for each of the phase angle sensing circuits 20 and 22. In this manner, the characteristic of each circuit it shifted from the R axis and about the origin through the angle $\alpha$. By a proper selection of L3 and R1, the combined and shifted characteristics 40 and 42 of the phase angle sensing circuits 20 and 22 can be made to correspond to the fault zone F.

Figure 6:
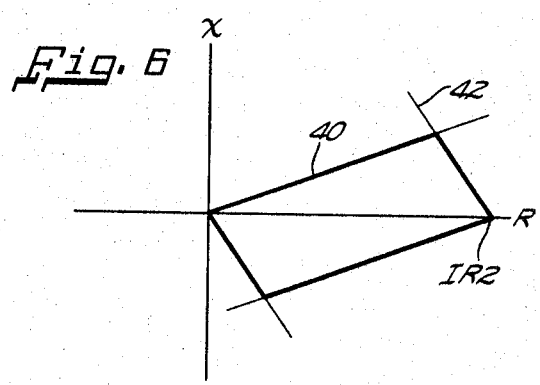
Figure 7:
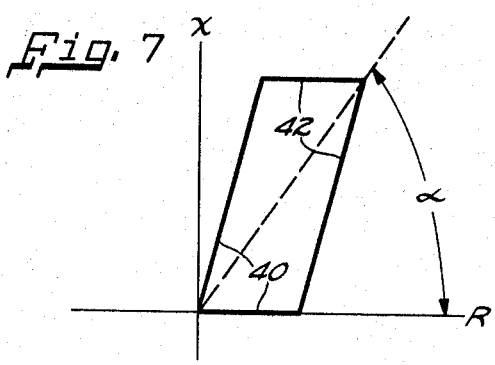

It can be seen that whenever the characteristics 40 and 42 combine in a single RX diagram as shown in FIGS. 6 and 7, they form a parallelogram. Referring again to FIG. 2, the characteristics 40 and 42 of each of the phase angle sensing circuits 20 and 22 are combined by means of an AND logic circuit 44 which includes a first NPN transistor Q3 whose emitter is connected to negative power supply conductor 30 and whose collector is connected to the emitter of a second NPN transistor Q3'. The collector of Q3' is connected to one side of relay coil L7, the other of which is connected to the positive battery supply conductor 31. The base of Q3 is connected to the base-one electrode of unijunction transistor Q1 through conductor 35, resistor R8 and diode D5, while the base of Q3' is similarly connected to the base-one electrode of Q1' through conductor 35', resistor R8' and diode D5'.

It will be appreciated that when the emitter of unijunction transistor Q1 of the first phase angle sensing circuit 20 is forward biased, a signal will be passed to the base of transistor Q3, so that Q3 will be forward biased. As a result, transistor Q3 will be forward biased when vector relationship between the voltage and current in line 11 has a predetermined value within the limits given by the characteristic 40 in FIG. 7 of the first phase angle sensing circuit 20. Similarly, when the emitter of unijunction transistor Q1' is forward biased, a signal will be passed to the base of transistor Q3'. Thus, transistor Q3' will be forward biased when the vector relationship between the voltage and current in line 11 has a predetermined value within the limits given by the characteristic 42 of the second phase angle sensing circuit 22, as seen in FIG. 7.

When each of the transistors Q3 and Q3' is conductive, relay coil L7 will be energized to close its contacts 45 and energize the trip solenoid 46 which, in turn, effects the opening of the circuit breaker contacts 10 in any manner well known in the art. It will thus be appreciated that by combining the characteristic 40 of first phase angle sensing circuit 20 and the characteristic 42 of the second phase angle sensing circuit 22 in the AND logic circuit 44, the combined characteristic seen in FIG. 7 is obtained. As a result, the circuit breaker interrupting contacts 10 will be opened whenever the vector relationship between the voltage current in line 11 falls within this combined characteristic. By a proper selection of components, this characteristic can be made to correspond to the fault zone F illustrated in FIG. 1.

From the foregoing, it can be seen that the phase angle sensing circuits 20 and 22 according to the instant invention have characteristics which, when combined, can be made to correspond to the actual fault zone of the line being protected. This insures that tripping will occur only if the system operating point actually moves within the fault zone.

While only a single embodiment of the instant invention has been shown and described, it is not intended to be limited thereby but only by the scope of the appended claims.

I claim:

1. A phase angle sensing circuit including first and second inputs constructed and arranged to be respectively connected to first and second sources of alternating electrical signals, first circuit means coupled to said inputs for performing a first function when the electrical signal at each of said inputs has a predetermined polarity, second circuit means coupled to said first circuit means and actuable by said first function to perform a second function after a time delay, and output circuit means connected to said second circuit means and constructed and arranged to perform an output function upon the occurrence of said second function.

2. A phase angle sensing circuit including first and second inputs constructed and arranged to be respectively connected to first and second sources of alternating electrical signals, logic circuit means coupled to said inputs for producing a first signal whenever the electrical signals at said inputs have a predetermined polarity, time delay circuit means disposed to receive said first signal and sensitive thereto to provide a control signal after a time delay, and output circuit means connected to said time delay circuit means and constructed and arranged to produce an output signal upon the occurrence of said time delayed signal.

3. A phase angle sensing circuit including first and second inputs constructed and arranged to be respectively connected to first and second sources of alternating electrical signals, bistable circuit means having a control element coupled to said inputs and an output and having a first output state when the signal at either of said inputs has a predetermined polarity and a second output state when each of said inputs has another polarity, time delay circuit means coupled to said bistable circuit means and normally being operative to provide a control signal after a time delay, said bistable circuit means being effective when in its second output state to render said time delay circuit means operative, and output circuit means connected to said time delay circuit means and constructed and arranged to produce an output signal upon the occurrence of said time delayed control signal.

4. A phase angle sensing circuit including first and second inputs constructed and arranged to be respectively connected to first and second sources of alternating electrical signals, time delay circuit means including energy storage means, first switching circuit means having a control coupled to said inputs and an output shunting said energy storage means and constructed and arranged to conduct output current when the electrical signal at either of said inputs has a predetermined polarity, power supply means connected to said energy storage means, and second switching circuit means having a control connected to said energy storage means and an output and constructed and arranged to produce an output signal when the charge in said energy storage means exceeds a predetermined value.

5. A phase angle sensing circuit including first and second inputs constructed and arranged to be respectively connected to first and second sources of alternating electrical signals, time delay circuit means including resistance and capacitance means, first switching circuit means having a control element coupled to said inputs and a pair of output elements connected in shunt with said capacitance and constructed and arranged to conduct output current when the electrical signal at either of said inputs has a predetermined polarity, power supply means connected to said capacitance means, and second switching circuit means having a control element connected to said capacitance means and a pair of output elements and constructed and arranged to produce an output signal when the charge in said capacitance means exceeds a predetermined value.

6. A phase angle sensing circuit including first and second inputs constructed and arranged to be respectively connected to sources of alternating voltage and current signals, time delay circuit means including energy storage means, OR logic circuit means having a control element coupled to said first and second inputs and output means connected to said energy storage means, said OR logic circuit means being constructed and arranged to prevent the storage of energy on said energy storage means when a predetermined polarity signal appears at either of said inputs, power supply means connected to said energy storage means, and level detecting means having a control means connected to said energy storage means and second and third means connected to said power supply means and being operative when the charge in said energy storage means exceeds a predetermined value.

7. A phase angle sensing circuit including first and second inputs constructed and arranged to be respectively connected to sources of alternating voltage and current signals, impedance means, unidirectional circuit means connecting said first and second inputs to said impedance means to produce a predetermined potential thereat when the voltage or current signals at either of said inputs has a predetermined polarity, time delay circuit means including a resistance and a capacitance, bistable switching circuit means having a control element coupled to said impedance means and a pair of output elements in shunt with said capacitance, said bistable switching circuit means being constructed and arranged to short circuit said capacitance when said predetermined potential appears at said resistance means, power supply means connected to said time delay circuit means, and level detecting means having a control element connected to said capacitance and second and third electrodes connected to said power supply means and being operative to fire when the charge in said capacitor exceeds a predetermined value.

8. A phase angle sensing circuit including first and second inputs constructed and arranged to be respectively connected to sources of alternating voltage and current signals, first resistance means, unidirectional circuit means connecting said first and second inputs to said first resistance means to produce a potential thereat when the voltage or current signals at either of said inputs has a predetermined polarity, time delay circuit means including second resistance means and a capacitance, transistor means having a base coupled to said first resistance means and an emitter-collector circuit in shunt with said capacitance, said transistor means being constructed and arranged to short circuit said capacitance when a potential appears at said first resistance means, power supply means connected to said time delay circuit means, and unijunction transistor means having an emitter connected to said capacitance and a base-one-base-two circuit connected to said power supply means and being operative to conduct emitter-base-one current when the charge on said capacitance exceeds a predetermined value.

9. In a distance relay for protecting an electrical system, input circuit means coupled to said system for producing alternating electrical signals having a phase relation functionally related to that of the voltage and current in said system, a phase angle sensing circuit including first and and second inputs coupled to said input circuit means for receiving said alternating electrical signals, switching circuit means having a control element coupled to said inputs and an output and being constructed and arranged to produced an output signal whenever the electrical signal at either of said inputs has a predetermined polarity, time delay circuit means coupled to said output and normally being operative to provide a signal after a time delay, said output signal rendering said time delay circuit means nonoperative, and output circuit means connected to said time delay circuit means and constructed and arranged to produce an output function upon the occurrence of said time delayed signal.

10. In a distance relay for protecting an electrical system, input circuit means coupled to said system for producing alternating voltage and current signals having a phase relation functionally related to that of the voltage and current in said system, a phase angle sensing circuit including first and second inputs coupled to said input circuit means for receiving said alternating voltage and current signals, time delay circuit means including resistance and capacitance means, logic circuit means coupled to said first and second input means and to said capacitance means, said logic circuit being operative to prevent the charging of said capacitance means when a signal having a predetermined polarity appears at either of said inputs, power supply means connected to said time delay circuit means and level detecting means having a control means connected to said capacitance means and second and third electrodes connected to said power supply means and being operative to fire when the charge in said capacitance means exceeds a predetermined value.

11. In a distance relay for protecting an electrical system, input circuit means coupled to said system for producing alternating voltage and current signals having a phase relation functionally related to that of the voltage and current in said system, a phase angle sensing circuit including first and second inputs coupled to said input circuit means for receiving said alternating voltage and current signals, first resistance means, unidirectional circuit means connecting said first and second inputs to said first resistance means to produce a potential thereat when the voltage or current signals at either or said inputs has a predetermined polarity, complex impedance means in circuit between said first input and said first resistance means, time delay circuit means including second resistance means and a capacitance, transistor means having a base coupled to said first resistance means and an emitter-collector circuit in shunt with said capacitance, said transistor means being constructed and arranged to short circuit said capacitance when a potential appears at said first resistance means, power supply means connected to said time delay circuit means, and unijunction transistor means having an emitter connected to said capacitance and a base-one-base-two circuit connected to said power supply means and being operative to conduct emitter-base-one current when the charge on said capacitance exceeds a predetermined value.

12. The phase angle sensing circuit set forth in claim 2 wherein said logic circuit means comprises an OR logic circuit for producing said first signal whenever the electrical signal at either of said inputs has a predetermined polarity.

13. The phase angle sensing circuit set forth in claim 2 wherein said logic circuit means is effective to initiatve the provision of a control signal by said time delay circuit when both of said electrical signals have a predetermined polarity.

14. The phase angle sensing circuit set forth in claim 3 wherein said time delay circuit means comprises an RC circuit, said bi-stable circuit means being operative to prevent charging of said time delay circuit in its first state and inoperative to prevent such charging when in its second state, and wherein said output circuit means comprises level detecting means for producing an output signal when the voltage on the RC circuit reaches a predetermined value.

References Cited

UNITED STATES PATENTS

| | | | |
|---|---|---|---|
| 2,406,016 | 8/1946 | Heising. | |
| 2,829,248 | 4/1958 | Oberbeck | 307—108 X |
| 3,100,854 | 8/1963 | Riebs | 317—22 |
| 3,119,064 | 1/1964 | Hillis | 307—88.5 X |

MILTON O. HIRSHFIELD, *Primary Examiner.*

R. V. LUPO, *Assistant Examiner.*